US008743448B2

(12) United States Patent
Chen et al.

(10) Patent No.: US 8,743,448 B2
(45) Date of Patent: Jun. 3, 2014

(54) METHOD AND APPARATUS FOR DETERMINING BIAS POINT OF MODULATOR

(75) Inventors: Jianhua Chen, Shenzhen (CN); Hong Yi, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 13/637,026

(22) PCT Filed: Aug. 16, 2010

(86) PCT No.: PCT/CN2010/076037
§ 371 (c)(1),
(2), (4) Date: Sep. 25, 2012

(87) PCT Pub. No.: WO2011/116578
PCT Pub. Date: Sep. 29, 2011

(65) Prior Publication Data
US 2013/0016418 A1 Jan. 17, 2013

(30) Foreign Application Priority Data
Mar. 25, 2010 (CN) .......................... 2010 1 0133170

(51) Int. Cl.
*G02F 1/01* (2006.01)
(52) U.S. Cl.
USPC ............ 359/279; 359/239; 359/245; 398/192
(58) Field of Classification Search
USPC ................. 359/238, 239, 245, 259, 276, 279; 398/185, 186, 192
See application file for complete search history.

(56) References Cited

U.S. PATENT DOCUMENTS

| 5,052,808 | A | | 10/1991 | Dykeman et al. |
| 6,014,241 | A | * | 1/2000 | Winter et al. .................. 359/245 |
| 6,046,838 | A | | 4/2000 | Kou et al. |
| 6,320,692 | B1 | * | 11/2001 | Notargiacomo .............. 359/245 |

(Continued)

FOREIGN PATENT DOCUMENTS

| CN | 1523400 A | 8/2004 |
| CN | 101354515 A | 1/2009 |
| CN | 101621329 A | 1/2010 |
| WO | 2009071930 A1 | 6/2009 |

OTHER PUBLICATIONS

P.R. China, State Intellectual Property Office, International Search Report for International Application No. PCT/CN2010/076037, mailed Dec. 30, 2010.

*Primary Examiner* — Loha Ben
(74) *Attorney, Agent, or Firm* — Bright IP Law Offices

(57) ABSTRACT

The disclosure discloses a method and an apparatus for determining a bias point of a modulator, wherein the method includes: adding pilot signals to the bias voltages of the modulator; adjusting the bias point of the modulator at a predetermined step and acquiring a first harmonic amplitude value corresponding to each bias point in a backlight detection current signal output by the modulator; and determining a bias point corresponding to the maximum value of the first harmonic amplitude values associated with multiple bias points as the bias point of the modulator. By virtue of the disclosure, the detection of a difference frequency signal can be eliminated, thereby reducing the complexity and cost of a periphery control circuit while ensuring the control accuracy, effectively improving the stability and reliability of the control process, and improving the modulation and transmission performance of optical signals in the whole system.

16 Claims, 4 Drawing Sheets

(56) References Cited

U.S. PATENT DOCUMENTS

| | | | |
|---|---|---|---|
| 6,426,822 B1 * | 7/2002 | Winter et al. | 398/192 |
| 7,394,992 B2 * | 7/2008 | Kimmitt et al. | 398/185 |
| 7,876,491 B2 * | 1/2011 | Ide et al. | 359/279 |
| 7,965,433 B2 * | 6/2011 | Smith et al. | 359/259 |
| 8,175,465 B2 * | 5/2012 | Wang et al. | 398/168 |
| 8,203,777 B2 * | 6/2012 | Smith et al. | 359/239 |
| 2009/0324252 A1 | 12/2009 | Nagayama et al. | |

* cited by examiner

METHOD AND APPARATUS FOR DETERMINING BIAS POINT OF MODULATOR

CROSS REFERENCE TO RELATED APPLICATIONS

This application is the U.S. National Stage of International Patent Application No. PCT/CN2010/076037 filed on Aug. 16, 2010, which claims priority to Chinese Patent Application No. 201010133170.9 filed on Mar. 25, 2010. Both the PCT Application and Chinese Application are hereby incorporated by reference in their entirety.

FIELD OF THE INVENTION

The disclosure relates to the field of communications, in particular to a method and an apparatus for determining a bias point of a modulator.

BACKGROUND OF THE INVENTION

At present, with the increase of the speed and capacity of an optical transmission system, the optical phase modulation method, with the Differential Quadrature Phase Keying (DQPSK) as a representative, is training more attention in the industry. In the DQPSK modulation method, four different phases of optical wave represent different data signals, and its code element speed is only half that of the traditional optical amplitude modulation method, therefore, such modulation method has a low requirement on an optical device. Furthermore, the DQPSK modulation has better dispersion and polarisation mode dispersion performance than the amplitude modulation, so that it can be adapted to the lame-capacity and long-distance optical transmission system better.

The principle of the DQPSK modulation will be described below briefly. It is assumed that the optical carrier in the optical fibre communication adopting the DQPSK modulation way is represented as follows: $E_i=E\exp j[\omega_0 t+\phi(t)]$, where E is field intensity, $\omega_0$ is the angular frequency of the optical carrier, and $\omega(t)$ is a modulation phase. The principle of the DQPSK modulation is: the information to be transmitted is encoded in a differential phase of a continuous optical bit and represented by $\Delta\phi$, where $\Delta\phi$ is a value from [0, $\pi/2$, $\pi$, $3\pi/2$]. It is assumed that the phase of the pulse of the k−1th optical bit is $\theta(k-1)$. If the subsequent bit is 0, 0, $\theta(k)=\theta(k-1)$; if it is 0, 1, $\theta(k)=\theta(k-1)+\pi/2$; if it is 1, 1, $\theta(k)=\theta(k-1)+\pi$; and if it is 1, 0, $\theta(k)=\theta(k-1)+3\pi/2$.

In a DQPSK modulation system, generally, a LiNbO3 modulator is required, however, the LiNbO3 modulator is very sensitive to the temperature and pressure due to its own material characteristics, therefore, a periphery control circuit is required to ensure the characteristics of the LiNbO3 modulator out of the influence of external factors and control it in order to implement a precise phase control in an actual system.

To ensure the accuracy of the modulation signal of the LiNbO3 modulator, now, the common control method mainly includes: (1) pilot signals of different frequencies are added to two arms of the DQPSK LiNbO3 modulator, and then, a backlight detection signal is collected to filter a difference frequency signal therein; when the difference frequency signal disappears, it may be thought that the LiNbO3 modulator is locked to a normal bias point. However, such method needs to introduce multiple pilot signals, besides, the detection result is the difference frequency signal, and the control loop is of high complexity, so that it is very difficult to implement the method. (2) A backlight detection signal is directly sampled to judge whether it contains a Radio Frequency (RF) harmonic signal at the same rate with the data bit stream; during the adjustment of the bias point of the LiNbO3 modulator, if the backlight detection signal contains no RF harmonic signal, it is thought that the bias point meets the requirement at the moment, and then the LiNbO3 modulator is locked normally. No pilot signal is required to implement such method, whereas, the data signal for the modulation is not the ideal digital signal with a sharp rising/falling edge, and harmonic signal noise may be introduced to influence the control, accordingly, the control accuracy is diminished.

Besides the LiNbO3 modulator, other modulators, which have multiple bias voltages and regulate the bias voltages for the Phase modulation of a signal, also have such problems as high complexity and poor accuracy, and now, there is still no effective solution for this.

SUMMARY OF THE INVENTION

The disclosure provides a method and an apparatus for determining the bias point of the modulator, so as to effectively diminish the control complexity of the modulator and ensure a higher control accuracy.

The technical solution of the disclosure is implemented as follows:

In one aspect, the disclosure provides a method for determining a bias point of a modulator, wherein the modulator has multiple bias voltages and modulates a phase of a signal by regulating the bias voltages.

The method for determining the bias point of the modulator includes: adding pilot signals to the bias voltages of the modulator; adjusting the bias point of the modulator at a predetermined step and acquiring a first harmonic amplitude value corresponding to each bias point in a backlight detection current signal output by the modulator, and determining a bias point corresponding to the maximum value of the first harmonic amplitude values associated with multiple bias points as the bias point of the modulator.

The process of adjusting the bias point of the modulator at the predetermined step includes: adjusting: the data volume of a digital signal to be input into the modulator at a predetermined step, and converting the adjusted digital signal into an analog signal and feeding the analog signal into the modulator, wherein the first harmonic amplitude values corresponding, to multiple bias points refer to those corresponding to multiple converted analog signals.

In addition, the process of acquiring the first harmonic amplitude value corresponding to each bias point in the backlight detection current signal output by the modulator includes: filtering the backlight detection current signal output by the modulator to obtain the first harmonic wave of the backlight detection current signal; and performing Analog to Digital (A/D) conversion on the first harmonic wave to obtain the first harmonic amplitude value of the backlight detection current signal.

Preferably, the frequency of the pilot signal is less than 1 MHz.

Optionally, the modulator is a LiNbO3 modulator. At the moment, the process of adding the pilot signals to the bias voltages of the modulator includes: adding the pilot signals to the bias voltages I of and Q channels of the modulator, respectively.

In another aspect, the disclosure provides an apparatus for determining a bias point of a modulator, and the apparatus is configured to control the bias point of the modulator which has multiple bias voltages and modulates a phase of a signal by regulating the bias voltages.

The apparatus for determining the bias point of the modulator includes: a pilot signal adding module, which is configured to generate a pilot signal and add the generated pilot signal to the bias voltages of the modulator; and a processing module, which is configured to adjust the bias point of the modulator at a predetermined step, acquire at first harmonic amplitude value corresponding to each bias point in a backlight detection current signal output by the modulator, and determine a bias point corresponding to the maximum value of the first harmonic amplitude values associated with multiple bias points as the bias point of the modulator.

The processing module includes: a digital algorithm processing unit, which is configured to adjust the data volume of a digital signal to be input to the modulator at a predetermined step to adjust the bias point of the modulator, and determine the maximum value of the first harmonic amplitude values; and a Digital to Analog (D/A) converter, which is configured to convert the digital signal adjusted each time by the digital algorithm processing unit into an analog signal to be input to the modulator; and wherein the first harmonic amplitude values corresponding to multiple bias points refer to those corresponding to multiple converted analog signals.

The processing module may further include: a filter, which is configured to filter the backlight detection current signal output by the modulator to obtain the first harmonic wave of the backlight detection current signal; and an A/D converter, which is configured to perform A/D conversion on the first harmonic wave obtained by the filter to obtain the first harmonic amplitude value of the backlight detection current signal and provide it to the digital algorithm processing unit.

Optionally, the modulator is a LiNbO3 modulator; and the pilot signal adding module is configured to add the pilot signals to the bias voltages of I and Q channels of the modulator, respectively.

According to the disclosure, the pilot signals are added to the bias voltages of a modulator, the bias point of the modulator is adjusted continuously and the first harmonic wave in the backlight detection signal output by the adjusted modulator is detected, and an optimal bias point is determined according to the maximum value of the first harmonic wave, so as to eliminate the detection of a difference frequency signal, thereby reducing the complexity and cost of a periphery control circuit while ensuring the control accuracy, effectively improving the stability and reliability of the control process, and improving the modulation and transmission performance of optical signals in the whole system.

DETAILED DESCRIPTION OF EMBODIMENTS

For various optical phase modulators, such as DQPSK LiNbO3 modulator, in the implementation process of the current control method, the periphery control circuit is the key factor directly affecting the performance of the whole DQPSK modulation system. If the periphery circuit has a high complexity, the control implementation difficulty will be increased and the control result is susceptible to be affected by external factors. Therefore, according to the disclosure, pilot signals are added to the bias voltages of the LiNbO3 modulator the bias point of the LiNbO3 modulator is adjusted continuously and the first harmonic wave in the backlight detection signal output by the LiNbO3 modulator adjusted each time is detected, and the optimal bias point is determined according to the maximum value of the first harmonic wave, thereby reducing the complexity and cost of a periphery control circuit while ensuring the control accuracy, effectively improving the stability and reliability of the control process, and improving the modulation and transmission performance of optical signals in the whole system.

The specific implementation of the disclosure will be described below in conjunction with the drawings in detail.

Method Embodiment

In the embodiment, a method for determining a bias point of a modulator is provided, wherein the modulator controllable by the method has multiple bias voltages and modulates a phase of a signal by regulating the bias voltages, for example, the method can be used for determining the bias point of a DQPSK LiNbO3 modulator.

Figure 1:
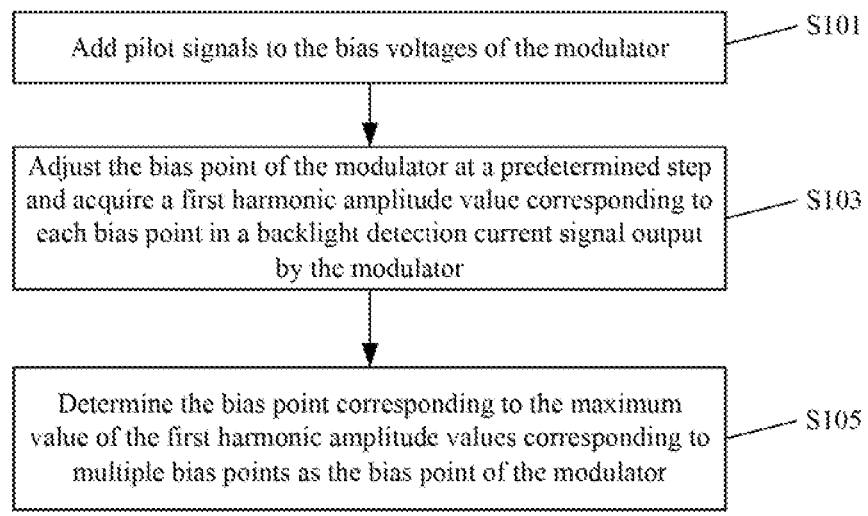
FIG. 1 is a flowchart of a method for determining a bias point of a modulator according to an embodiment of the disclosure

As shown in FIG. 1, the method for determining the bias point of the modulator according to the embodiment includes:

Step 101: add pilot signals to the bias voltages of the modulator.

Step 103: adjust the bias point of the modulator at a predetermined step and acquire a first harmonic amplitude value corresponding to each bias point in a backlight detection current signal output by the modulator.

Step 105: determine a bias point corresponding to the maximum value of the first harmonic amplitude values associated with multiple bias points as the bias point of the modulator.

Through the processing, pilot signals are added to the bias voltages of the modulator, the bias point of the modulator is adjusted continuously and the first harmonic wave in the backlight detection signal output by the modulator adjusted each time is detected, and the optimal bias point is determined according to the maximum value of the first harmonic wave, so as to eliminate the detection of a difference frequency signal, thereby reducing the complexity and cost of a periphery control circuit while ensuring the control accuracy, effectively improving the stability and reliability of the control process, and improving the modulation and transmission performance of optical signals in the whole system.

In addition, a small step value may be adopted if a high-accuracy control is desired, and a large step value may be adopted if a fast control is desired. Furthermore, in a control process, the predetermined step mentioned in Step 103 is not limited to the fixed step value, that is to say, the bias point may be adjusted for many times in a control process and different steps may be adopted for each adjustment. For example, the bias point may be adjusted at a step of 4 for the first time, 3 for the second time, 2 for the third time, and 1 for the fourth and fifth times. The specific step selection policy may be preset, and the details about how to select the step are not described here anymore.

If the debugging target is the DQPSK LiNbO3 modulator, in Step 101, the process of adding pilot signals to the bias voltages of the modulator includes: adding the pilot signals to the bias voltages of I and Q channels of the modulator. Thus, the frequency of the pilot signals added to the bias voltages of I and Q channels is the same. Although the pilot signal needs to be introduced, the control complexity may not be increased obviously, besides, it is unnecessary to acquire a difference frequency signal in the subsequent detection process.

In Step 103, there are many ways for adjusting the bias point of the modulator at the predetermined step, preferably, the data volume of the digital signal to be input to the modulator may be adjusted at the predetermined step. Because the modulator can only process analog signals, it is necessary to convert the digital signal adjusted each time into the analog signal to be input to the modulator. Thus, the first harmonic amplitude values corresponding to multiple bias points refer to those corresponding to multiple converted analog signals.

After each adjustment of the data volume of the digit signal to be input to the modulator, the analog signal obtained by D/A conversion will also be changed correspondingly, so as to adjust the bias point.

Thus, it is assumed that the data volume range corresponding to the allowable voltage range of the bias point is from 200 to 500, the initial value of the data volume is 200, and the step is 100. By Step 103, firstly, the input digital signal with a data volume of 200 is converted into the analog signal to be input to the modulator to obtain an output backlight detection signal, so that the first harmonic amplitude value corresponding to the data volume of 200 is acquired, and then, the data volume is adjusted to 300 to obtain the first harmonic amplitude value corresponding to the data volume of 300, and so on. After the first harmonic amplitude values corresponding to the data volumes of 400 and 500 are acquired, the maximum value in the four first harmonic amplitude values is determined, and the input data volume (bias point) corresponding to the maximum value is deemed to be the optimal bias point. As mentioned above, the step may be decreased if the debugging accuracy is desired to be improved, for example, the step may be decreased from 100 to 50 (or decreased to other values), very flexibly.

Preferably, when the bias point of the modulator is determined at the first time, the bias point may be adjusted continuously within a large range (for example, within the full range of the bias point), (i.e., scanning); when the bias point is determined subsequently, for example, when the bias point of the modulator needs to be further adjusted as it may change due to the external factors, the bias point may be adjusted within a small range in the vicinity of the bias point determined before as the bias point may change slightly; moreover, to ensure the accuracy of determining the bias point subsequently, the bias point may be adjusted at a smaller step so as to determine the optimal bias point as precisely as possible.

Besides the way that the bias point of the modulator is adjusted by adjusting the digital signal, the bias point can also be adjusted by directly adjusting the analog signal input to the modulator.

After each adjustment of the bias point, the backlight detection signal output by the modulator is the analog signal. To count the first harmonic amplitude in the backlight detection signal conveniently, preferably, in Step 105, when the first harmonic amplitude value corresponding to each bias point in the backlight detection current signal output by the modulator is acquired, the backlight detection current signal output by the modulator may be filtered to obtain the first harmonic wave of the backlight detection current signal; and the first harmonic wave is subjected to AD conversion (i.e., converting the analog signal into the digital signal), to obtain the first harmonic amplitude value of the backlight detection current signal.

In the processing there is no specific requirement on the frequency and waveform of the pilot signal. Preferably, to reduce interference, the frequency of the added pilot signal may be less than 1 MHz, generally several KHz.

To be explained more clearly in theory, the control process of the disclosure will be described below using sine wave as the pilot signal and the control of the DQPSK LiNbO3 modulator as an example in detail. Besides the sine wave, the analog signals of various waveforms may also serve as the pilot signal in the disclosure, and are applicable to various modulators which have the similar principle as that of the DQPSK LiNbO3 modulator, and there is no need to enumerate all the discussions here.

Figure 2:
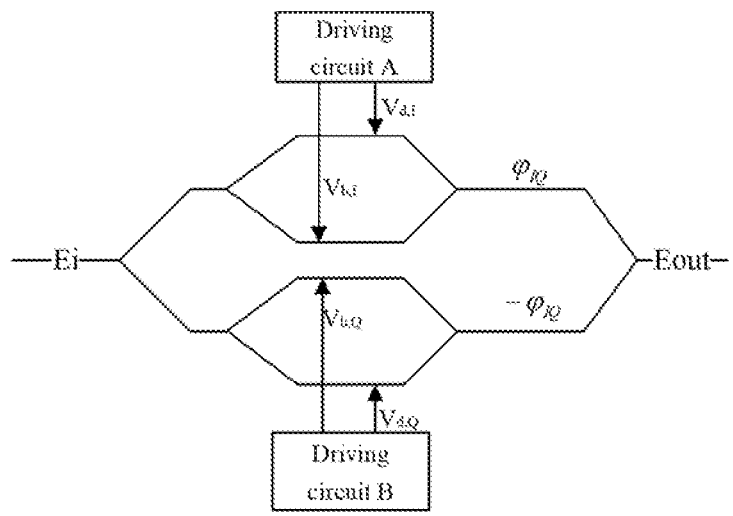
FIG. 2 is a diagram showing the structure of a DQPSK LiNbO3 modulator controlled by a method for determining a bias point of a modulator according to an embodiment of the disclosure.

At a transmission end, the optical phase modulation is implemented by a DQPSK LiNbO3 modulator. FIG. 2 is a diagram showing the structure of a DQPSK LiNbO3 modulator controlled by a method for determining a bias point of a modulator according to one embodiment of the disclosure. As shown in FIG. 2, the I-channel signal of the modulator is controlled by driving circuit A, and the Q-channel signal of the modulator is controlled by driving circuit B.

The intensity of the light output by the DQPSK LiNbO3 modulator may be represented as follows:

$$|E_{out}|^2 = \frac{|E_i|^2}{4}\left[\sin^2\frac{\pi(V_{d,I}+V_{b,I})}{2V_{\pi,I}} + \sin^2\frac{\pi(V_{d,Q}+V_{b,Q})}{2V_{\pi,Q}} - 2\sin\frac{\pi(V_{d,I}+V_{b,I})}{2V_{\pi,I}}\sin\frac{\pi(V_{d,Q}+V_{b,Q})}{2V_{\pi,Q}}\cos 2\varphi_{IQ}\right] \quad \text{FORMULA (1)}$$

where $V_{d,I}$, $V_{\pi,I}$ and $V_{b,I}$ represent the modulation amplitude, $V_\pi$ voltage and bias voltage of I channel, respectively; $V_{d,Q}$, $V_{\pi,Q}$ and $V_{b,Q}$ represent the modulation amplitude, $V_\pi$ voltage and bias voltage of Q channel, respectively.

For the DQPSK modulation, each bias point needs to be controlled to meet the following conditions:

$$V_{d,I} = \pm V_{\pi,I},\ V_{b,I} = 0;\ V_{d,Q} = \pm V_{\pi,Q},\ V_{b,Q} = 0 \quad \text{FORMULA (2)}$$

$$2\varphi_{I,Q} = \frac{\pi}{2} \quad \text{FORMULA (3)}$$

The bias points $V_{b,I}$ and $V_{b,Q}$ may be controlled by the current conventional method; and the conditions $V_{d,I}=\pm V_{\pi,I}$ and $V_{d,Q}=\pm V_{\pi,Q}$ to be met may be realized by controlling the amplitude of the RF signal input to the modulator.

To control the bias point $$\varphi_{IQ} = \frac{\pi}{4},$$

the pilot signal A cos ωt may be added to the I and Q channels (two arms) of the LiNbO3 modulator, and the additional phase difference introduced by the pilot signal between the I and Q arms is $$\frac{A\pi}{V_\pi}\cos\omega t = k\cos\omega t,$$

where $$k = \frac{A\pi}{V_\pi},$$

therefore, the output light intensity represented by formula (1) after the pilot signal is added may be represented by:

$$|E_{out}|^2 = \frac{|E_i|^2}{4}\left[\sin^2\frac{\pi(V_{d,I} + V_{b,I})}{2V_{\pi,I}} + \sin^2\frac{\pi(V_{d,Q} + V_{b,Q})}{2V_{\pi,Q}} - 2\sin\frac{\pi(V_{d,I} + V_{b,I})}{2V_{\pi,I}}\sin\frac{\pi(V_{d,Q} + V_{b,Q})}{2V_{\pi,Q}}\cos(2\varphi_{IQ} + k\cos\omega t)\right]$$ FORMULA (4)

From formula (2).

$$\sin^2\frac{\pi(V_{d,I} + V_{b,I})}{2V_{\pi,I}} = \sin^2\frac{\pi(V_{d,Q} + V_{b,Q})}{2V_{\pi,Q}} = 1$$ FORMULA (5)

may be obtained.
That is to say, $$|E_{out}|^2 = \frac{|E_i|^2}{4}[2 \pm 2\cos(2\varphi_{IQ} + k\cos\omega t)]$$

$$= \frac{|E_i|^2}{2} \pm \frac{|E_i|^2}{2}\cos 2\varphi_{IQ}\cos(k\cos\omega t) \mp \frac{|E_i|^2}{2}\sin 2\varphi_{IQ}\sin(k\cos\omega t)$$

$$= \frac{|E_i|^2}{2} \pm \frac{|E_i|^2}{2}\cos 2\varphi_{IQ} \times \sum_{n=0}^{\infty} a_{2n}\cos(2n\omega t) \mp \frac{|E_i|^2}{2}\sin 2\varphi_{IQ} \times \sum_{m=0}^{\infty} b_{2m+1}\cos[(2m+1)\omega t]$$

may be obtained, where $a_{2n}$ and $b_{2m+1}$ are coefficients obtained by performing Fourier expansion on $\cos(k\cos\omega t)$ and $\sin(k\cos\omega t)$, therefore, the amplitude A1 of the first harmonic wave in the backlight detection may be represented by:

$$A1 = \frac{|E_i|^2}{2}\sin 2\varphi_{IQ}b_1;$$

where $E_i$ and $b_i$ are constants, here, $$2\varphi_{IQ} = \frac{\pi}{2},$$

i.e., $$\varphi_{IQ} = \frac{\pi}{4}$$

can be obtained only by detecting the amplitude of the first harmonic wave in the backlight detection signal and adjusting the bias point to make the amplitude reach the maximum value, so as to lock the DQPSK LiNbO3 modulator at a rational bias point.

In the description above, the use of the sine wave as the pilot, signal is only a specific example for theoretical derivation. In an actual application, analog signals of various waveforms may also serve as the pilot signal; and furthermore, other modulators having the same principle as the DQPSK LiNbO3 modulator (the modulators also having multiple bias voltages and adjusting the magnitude of the voltages to modulate a signal) also can reach a similar effect.

Through the processing, the pilot signals can be added to the bias voltages of the modulator, a phase delay bias point is changed to control the modulator, and the backlight current signal is collected and filtered to obtain a first harmonic component therein and further to realize the maximum first harmonic component value through the feedback control. At the moment, the modulator is locked at a correct bias point. Furthermore, a digital signal circuit may be adopted to adjust the bias point in the disclosure. The digital circuit itself is strong in programmability and functions, low in cost and not susceptible to be affected by the external factors, therefore, the complexity of the whole control process can be diminished, the debugging flexibility and stability are improved, and the digital circuit can be widely applied to systems of various capacities, such as a 40 G dense wavelength division system.

Apparatus Embodiment

In the embodiment, an apparatus for determining a bias point of a modulator is provided, which is configured to control the bias point of the modulator which has multiple bias voltages and modulates a phase of a signal by regulating the bias voltages (such as the magnitude of the voltages), for example, controlling a. DQPSK LiNbO3 modulator.

Figure 3:
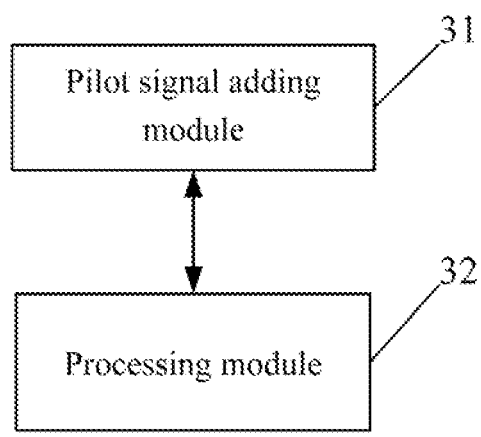
FIG. 3 is a block diagram showing the structure of an apparatus for determining a bias point of a modulator according to an embodiment of the disclosure.

As shown in FIG. 3, the apparatus for determining the bias point of the modulator according to the embodiment includes:

a pilot signal adding module 31, which is configured to generate a pilot signal and add the generated pilot signal to the bias voltages of the modulator; and a processing module 32, which is configured to adjust the bias point of the modulator at a predetermined step, acquire a first harmonic amplitude value corresponding to each bias point in a backlight detection current signal output by the modulator, and determine a bias point corresponding to the maximum value of the first harmonic amplitude values associated with multiple bias points as the bias point of the modulator.

Through the apparatus, pilot signals are added to the bias voltages of the modulator, the bias point of the modulator is adjusted continuously and the first harmonic wave in the backlight detection signal output by the modulator adjusted each time is detected, and the optimal bias point is determined according to the maximum value of the first harmonic wave, so as to eliminate the detection of a difference frequency signal, thereby reducing the complexity and cost of a periphery control circuit while ensuring the control accuracy, effectively improving the stability and reliability of the control process, and improving the modulation and transmission performance of optical signals in the whole system.

Specifically, the pilot signal adding module 31 can be configured to add the pilot signals to the bias voltages of I and Q channels of the modulator during controlling the DQPSK LiNbO3 modulator.

Because the way of changing the bias point by the digital signal is more simple an convenient, and flexible, the processing module 32 can include: a digital algorithm processing unit (not shown), which is configured to adjust the data volume of the digital signal to be input to the modulator at the predetermined step so as to adjust the bias point of the modulator, and to determine the maximum value of the first harmonic amplitude values; and a D/A converter (not shown), which is configured to convert the digital signal adjusted each time by the digital algorithm processing unit into an analog signal to be input to the modulator, wherein the first harmonic amplitude values corresponding to multiple bias points refer to those of multiple converted analog signals.

Preferably, the digital algorithm processing unit can be implemented by a Digital Signal Processor (DSP), a Field Programmable Gate Array (FPGA) and the like.

Furthermore, to acquire the first harmonic amplitude value conveniently, first harmonic signal may be converted into the digital signal. The processing module 32 can further include: a filter (not shown), which is configured to filter the backlight detection current signal output by the modulator to obtain the first harmonic wave of the backlight detection current signal; and, an A/D converter (not shown), which is configured to perform A/D conversion on the first harmonic wave obtained by the filter to obtain the first harmonic amplitude value of the backlight detection current signal and provide it to the digital algorithm processing unit. Optionally, the first harmonic wave of the backlight detection current signal may be obtained either by filtering by a hardware filter or by filtering by an algorithm.

Preferably, to avoid interference, the frequency of the pilot signal may be less than 1 MHz.

Preferably, the filter may be a narrow-band band-pass filter with a center frequency of ω and it is configured to filter the backlight current of the modulator.

The A/D converter may be a high-speed high-accuracy A/D converter, and the D/A converter may be a high-speed high-accuracy D/A converter. The feedback quantity of the digital algorithm processing unit is returned to the modulator. In addition, the pilot signal adding module can also be implemented by the high-speed high-accuracy D/A converter. In the actual application, the D/A converter can be either integrated with the pilot signal adding module or arranged separately.

Figure 4:
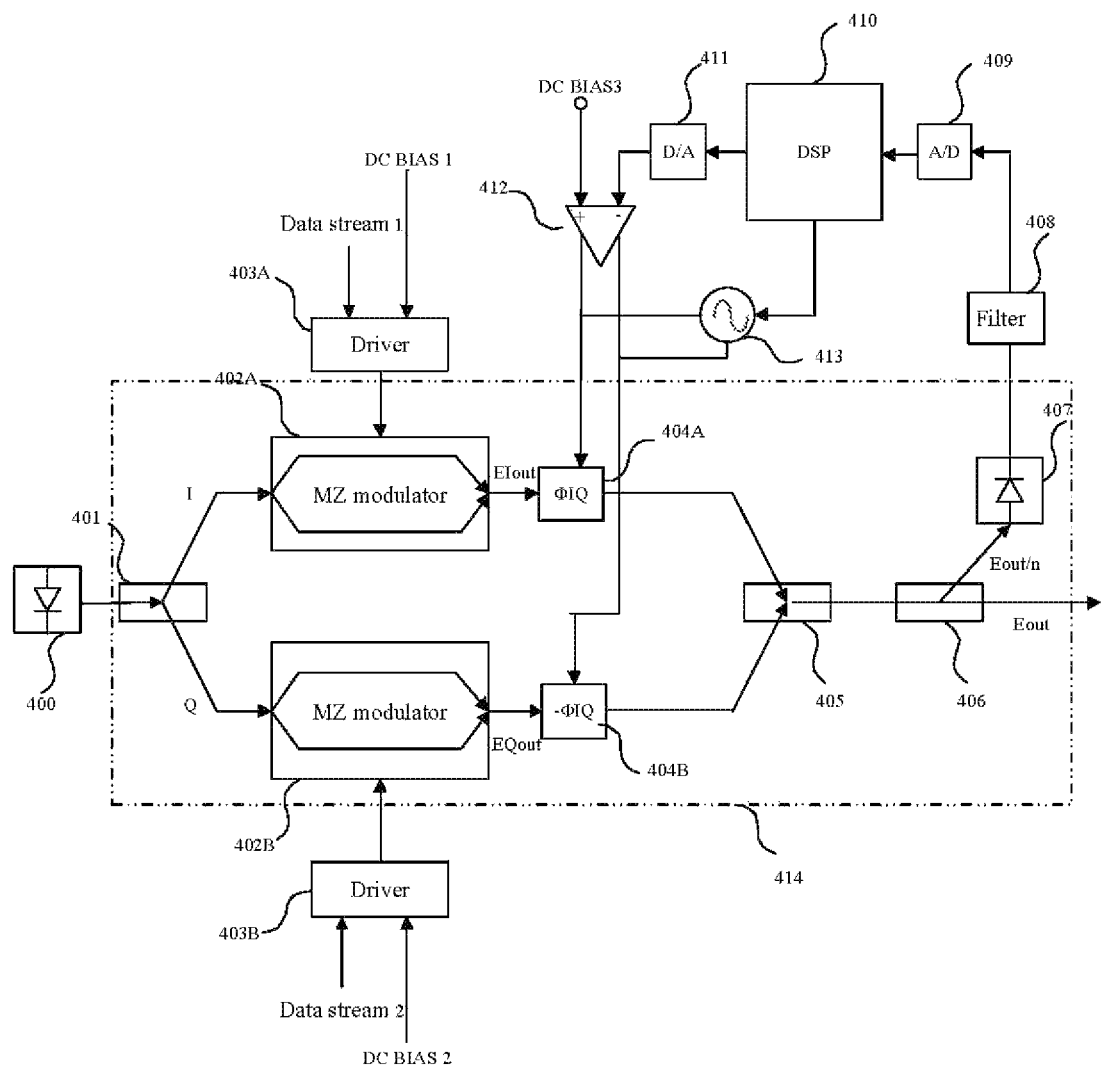
FIG. 4 is a diagram showing the connection between a DQPSK LiNbO3 modulator and an apparatus for determining, a bias point of a modulator according to an embodiment of the disclosure.

FIG. 4 shows an example of a connection way between a DQPSK LiNbO3 modulator and an apparatus for determining it bias point of a modulator according to the embodiment, specifically showing the connection relationship between the modulator 414 and other periphery devices. In the actual application, other parts except the modulator 414 in FIG. 4 may be integrated to the modulator according to the demands, and, partial parts of the modulator 414 may also be removed out of the modulator to be arranged separately outside the modulator or integrated with other devices, which needs no further description.

As shown in FIG. 4, an optical signal from a laser 400 is divided into the optical signals in I and Q channels through a coupler 401 (which may be a 3 dB coupler), then, the I-channel optical signal outputs $E_{Iout}$ through an MZ modulator 402A, wherein the MZ modulator 402A is modulated by data stream I and works under the drive of a driver 403A (the bias point of which is set by an external voltage Direct Current (DC) bias I). Similarly, the Q-channel optical signal outputs $E_{Qout}$ through an MZ modulator 402B, wherein the MZ modulator 402B is modulated by data stream 2 and works under the drive of a driver 403B (the bias point of which is set by an external voltage DC bias 2). $E_{Iout}$ and $E_{Qout}$ are subjected to phase delay by two delay modules ΦIQ404A and −ΦIQ404B, and then synthesized into $E_{out}$ and $E_{outT/n}$ by a coupler 405 and a coupler 406 (which can be 3 dB couplers), and $E_{outT/n}$ is used for backlight detection hi the system.

The DSP 410 (equivalent to the digital algorithm processing unit) is a unit configured to control and adjust the bias point of the modulator. The bias voltage of the modulator may be modified after the bias point is adjusted. It should be noted that the modified bias voltage after the bias point is adjusted here is not the bias voltages of the drivers in I and Q channels mentioned above.

During the control, firstly, the DSP 410 controls the D/A 411 (equivalent to the D/A converter) to generate a pilot signal (413) with a frequency of ω according to a digital algorithm, and the pilot signal is added to the two main arms (i.e., the bias voltages of I and Q channels of the modulator) of the DQPSK LiNbO3 modulator after being amplified by an integrated operational amplifier 412. After the pilot signal is added, a signal with the same fundamental frequency may be detected in the backlight detection signal passing through the backlight diode 407 of the modulator; a narrow-band filter 408 with a center frequency of ω is utilized to filter the first harmonic wave in the backlight detection signal, and then a high-speed high-accuracy A/D 409 (equivalent to the A/D converter above) collects the backlight detection signal into the DSP 410, to obtain the amplitude information $$A1 = \frac{|E_i|^2}{2}\sin 2\varphi_{IQ} b_1$$

of the first harmonic wave. The DSP can adjust the bias point of the DQPSK LiNbO3 modulator using the external high-speed high-accuracy D/A 411 and the adjustment approach above to obtain the first harmonic amplitude value of each bias, that is, a group of first harmonic component amplitude values of the modulator under the control of different bias voltages can be obtained; and the maximum value of the amplitude values can be obtained by the digital algorithm in the DSP. The bias point corresponding to the maximum value (specifically the bias voltage of the modulator) can be taken as the correct location where the DQPSK LiNbO3 modulator is locked.

Figure 5:
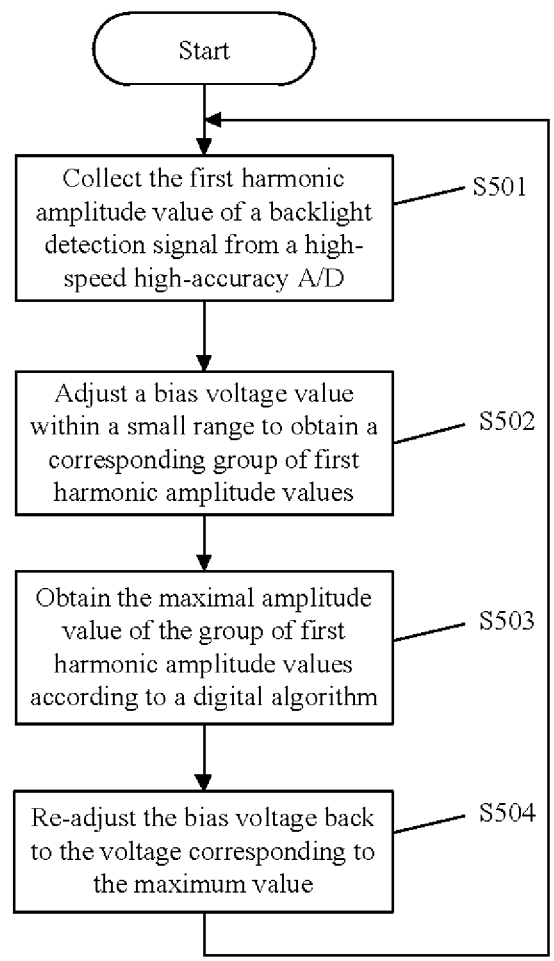
FIG. 5 is a flowchart showing the process of controlling a DQPSK LiNbO3 modulator using an apparatus for determining, a bias point of a modulator according to an embodiment of the disclosure.

FIG. 5 shows the process of determining the bias point of the modulator by the apparatus. As shown in FIG. 5, the process specifically includes:

Step 501: Collect the first harmonic amplitude value of a backlight detection signal from a high-speed high-accuracy A/D (the first harmonic amplitude value is obtained by a filter).

Step 502: Adjust the bias point within a small range to obtain a corresponding group of first harmonic amplitude values.

Step 503: Obtain the maximal value of the amplitude values according to a digital algorithm.

Step 504: Re-adjust the bias voltage to the bias point corresponding to the maximum first harmonic amplitude value.

To ensure that the modulator can work in a high accuracy for a long time. Steps 501 to 504 may be repeated after the delay for some time.

If a filtering algorithm is adopted for filtering, a process similar to that shown in FIG. 5 may also be adopted. The difference lies in that the backlight detection signal only needs to be collected from the high-speed high-accuracy A/D converter in Step 501. Before Step 502, it is further necessary to perform filtering according to the digital filtering algorithm to obtain the amplitude value of the first harmonic wave.

Step 502: Adjust the bias point within a small range to obtain a corresponding group of first harmonic amplitude values.

Step 503: Obtain the maximal value of the amplitude values according to a digital algorithm.

Step 504: Re-adjust the bias voltage to the bias point corresponding to the maximum first harmonic amplitude value.

To ensure that the modulator can work in a high accuracy for a long time. Steps 501 to 504 may be repeated after the delay for some time.

In addition, the processing module in the apparatus in the embodiment can also select the adjustment step for the bias point by the way described in the method embodiment. The predetermined step of each control process is not limited to a fixed value, and the bias point may be adjusted at a smaller step in the possible small range of the bias point in the subsequent adjustment process, so as to further improve the accuracy of the bias point finally determined.

In the actual application process, to control the bias point by the technical solution of the disclosure, the flow in FIG. 5 may be adopted and may also be modified by other ways according to the actual application scenario, and there is no need to enumerate all the discussions here.

To sum up, by the technical solution of the disclosure, pilot signals are added to the bias voltages of the modulator, the phase delay bias point is changed to control the modulator, and the backlight current signal is collected for filtering to obtain the first harmonic component therein and further to realize the maximum first harmonic component value through feedback control. At the moment, the modulator is locked at a correct bias point. Furthermore, a digital signal circuit can be adopted to adjust the bias point in the disclosure. The digital circuit itself is strong in programmability and functions, low in cost and not susceptible to be affected by the external factors, therefore, the complexity of whole debugging process can be diminished, the debugging flexibility and stability are improved, and the digital circuit can be widely applied to systems of various capacities, such as a 40G dense wavelength division system.

The above are only preferred embodiments of the disclosure and not intended to limit the disclosure; and any modifications, equivalent replacements, improvements and the like within the spirit and principle of the disclosure shall fall within the scope of protection of the disclosure.

What is claimed is:

1. A method for determining a bias point of a modulator, wherein the modulator has multiple bias voltages and modulates a phase of a signal by regulating the bias voltages, comprising:
adding pilot signals to the bias voltages of the modulator;
adjusting the bias point of the modulator at a predetermined step and acquiring a first harmonic amplitude value corresponding to each bias point in a backlight detection current signal output by the modulator; and
determining a bias point corresponding to a maximum value of the first harmonic amplitude values associated with multiple bias points as the bias point of the modulator.

2. The method for determining the bias point according to claim 1, wherein the step of adjusting the bias point of the modulator at a predetermined step comprises:
adjusting a data volume of a digital signal to be input into the modulator at the predetermined step, and converting the adjusted digital signal into an analog signal and feeding the analog signal into the modulator; and
wherein the first harmonic amplitude values corresponding to multiple bias points refer to those corresponding to multiple converted analog signals.

3. The method for determining the bias point according to claim 2, wherein the frequency of the pilot signal is less than 1 MHz.

4. The method for determining the bias point according to claim 2, wherein the modulator is a LiNbO3 modulator.

5. The method for determining the bias point according to claim 1, wherein the step of acquiring the first harmonic amplitude value corresponding to each bias point in the backlight detection current signal output by the modulator comprises:
filtering the backlight detection current signal output by the modulator to obtain a first harmonic wave of the backlight detection current signal; and
performing Analog to Digital (A/D) conversion on the first harmonic wave to obtain the first harmonic amplitude value of the backlight detection current signal.

6. The method for determining the bias point according to claim 5, wherein the frequency of the pilot signal is less than 1 MHz.

7. The method for determining the bias point according to claim 5, wherein the modulator is a LiNbO3 modulator.

8. The method for determining the bias point according to claim 1, wherein the frequency of the pilot signal is less than 1 MHz.

9. The method for determining the bias point according to claim 1, wherein the modulator is a LiNbO3 modulator.

10. The method for determining the bias point according to claim 9, wherein the step of adding the pilot signals to the bias voltages of the modulator comprises:
adding the pilot signals to the bias voltages of I and Q channels of the modulator, respectively.

11. An apparatus for determining a bias point of a modulator, which is configured to control the bias point of the modulator which has multiple bias voltages and modulates a phase of a signal by regulating the bias voltages, the apparatus comprises:
a pilot signal adding module, configured to generate a pilot signal and add the generated pilot signal to the bias voltages of the modulator; and
a processing module, configured to adjust the bias point of the modulator at a predetermined step, acquire a first harmonic amplitude value corresponding to each bias point in a backlight detection current signal output by the modulator, and determine a bias point corresponding to a maximum value of the first harmonic amplitude values associated with multiple bias points as the bias point of the modulator.

12. The apparatus for determining the bias point according to claim 7, wherein the processing module comprises:
a digital algorithm processing unit, configured to adjust a data volume of a digital signal to be input to the modulator at the predetermined step to adjust the bias point of the modulator, and determine the maximum value of the first harmonic amplitude values; and
a Digital to Analog (D/A) converter, configured to convert the digital signal adjusted each time by the digital algorithm processing unit into an analog signal to be input to the modulator; and wherein the first harmonic amplitude values corresponding to multiple bias points refer to those corresponding to multiple converted analog signals.

13. The apparatus for determining the bias point according to claim 12, wherein the processing module further comprises:

a filter, configured to filter the backlight detection current signal output by the modulator to obtain a first harmonic wave of the backlight detection current signal; and an A/D converter, configured to perform A/D conversion on the first harmonic wave obtained by the filter to obtain the first harmonic amplitude value of the backlight detection current signal and provide it to the digital algorithm processing unit.

14. The apparatus for determining the bias point according to claim 13, wherein the modulator is a LiNbO3 modulator; and the pilot signal adding module is configured to add the pilot signals to the bias voltages of I and Q channels of the modulator, respectively.

15. The apparatus for determining the bias point according to claim 12, wherein the modulator is a LiNbO3 modulator; and the pilot signal adding module is configured to add the pilot signals to the bias voltages of I and Q channels of the modulator, respectively.

16. The apparatus for determining the bias point according to claim 11, wherein the modulator is a LiNbO3 modulator; and the pilot signal adding module is configured to add the pilot signals to the bias voltages of I and Q channels of the modulator, respectively.

* * * * *